July 14, 1942.     R. G. FERRIS     2,289,769
GRAPPLE FORK
Filed Nov. 30, 1940     7 Sheets-Sheet 1
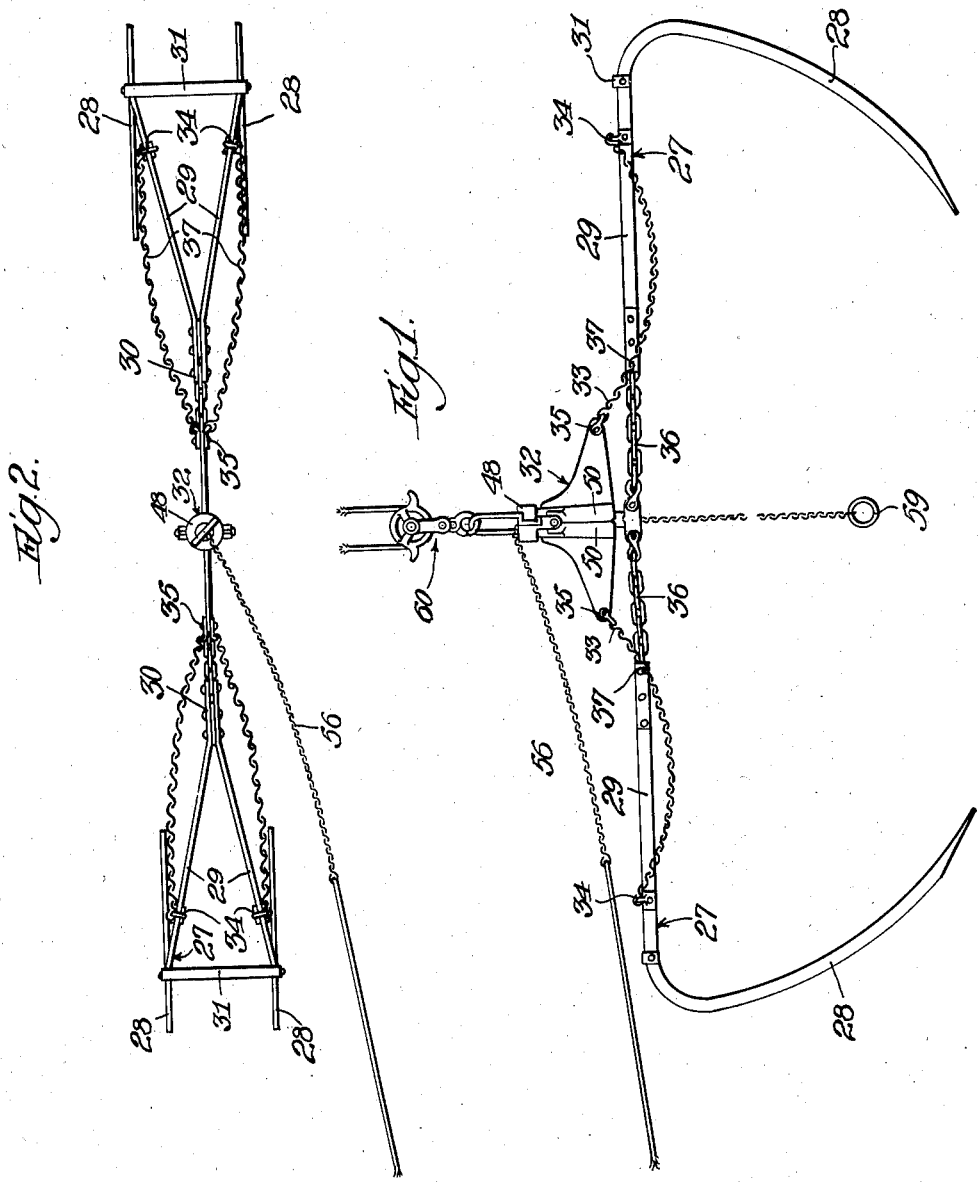
Inventor:
Robert G. Ferris,
By Critton, Wiles, Davies, Hirschl & Dawson,
Attys.

July 14, 1942.  R. G. FERRIS  2,289,769
GRAPPLE FORK
Filed Nov. 30, 1940  7 Sheets-Sheet 2
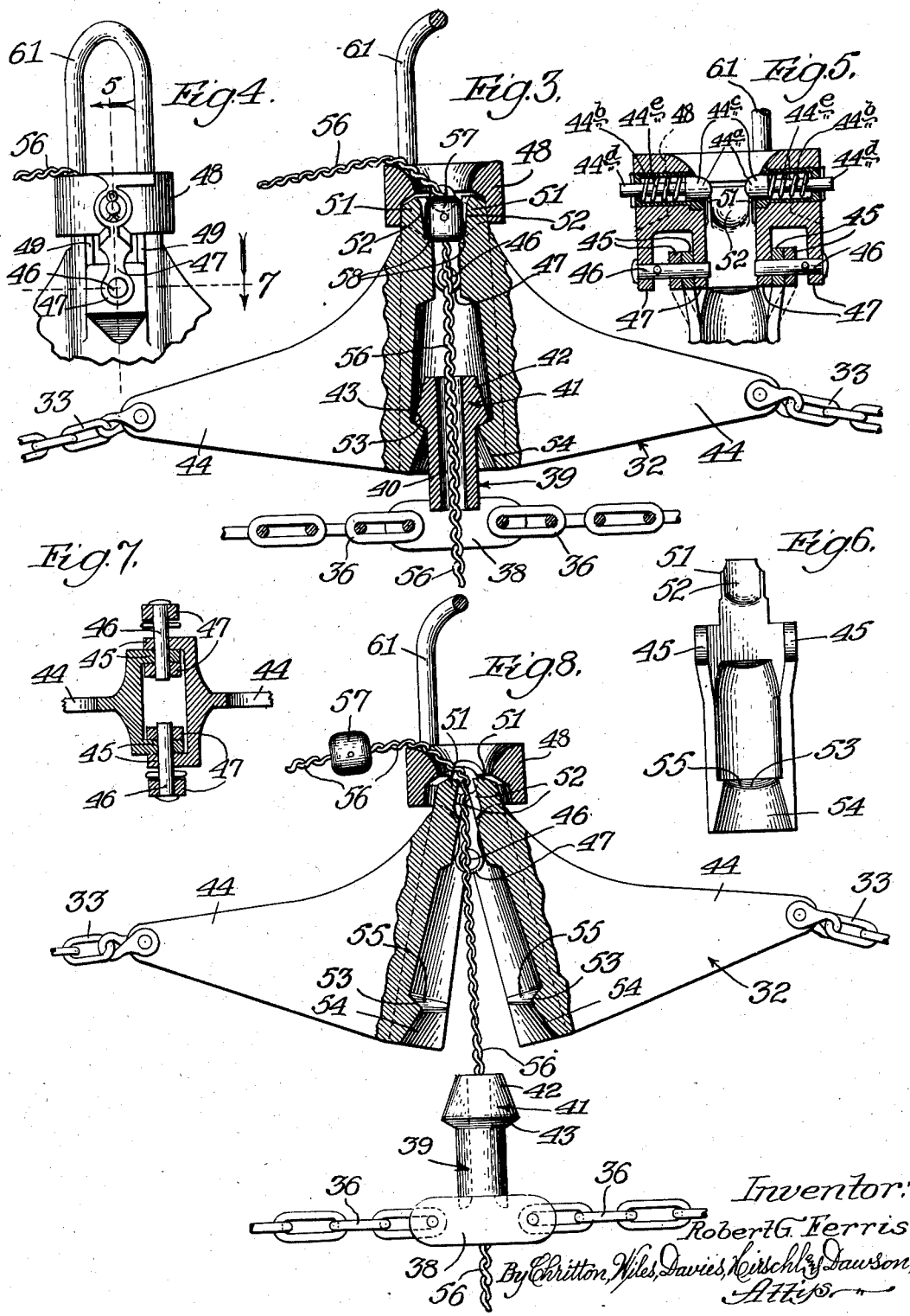
Inventor:
Robert G. Ferris
By Critton, Wiles, Davies, Hirschl & Dawson,
Attys.

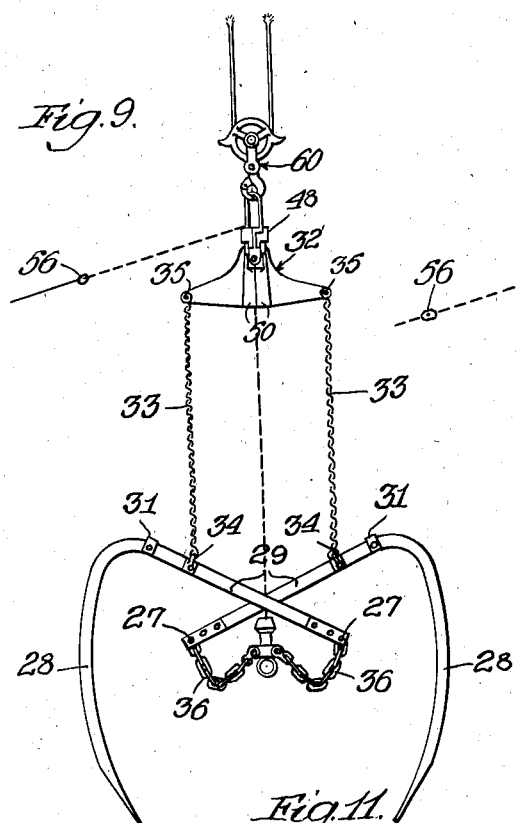
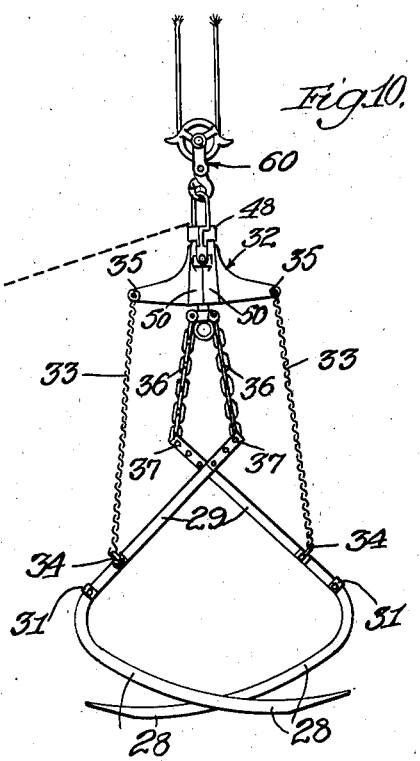
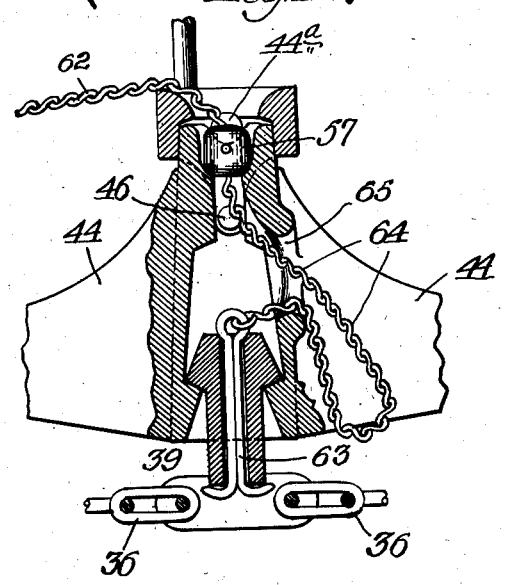
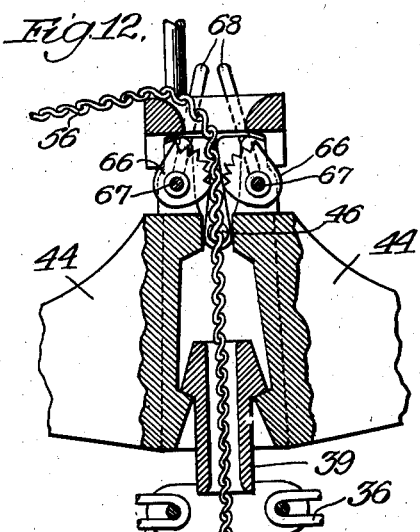

July 14, 1942.  R. G. FERRIS  2,289,769
GRAPPLE FORK
Filed Nov. 30, 1940  7 Sheets-Sheet 4

Inventor:
Robert G. Ferris,
By Chritton, Wiles, Davies, Hirschl & Dawson,
Attys

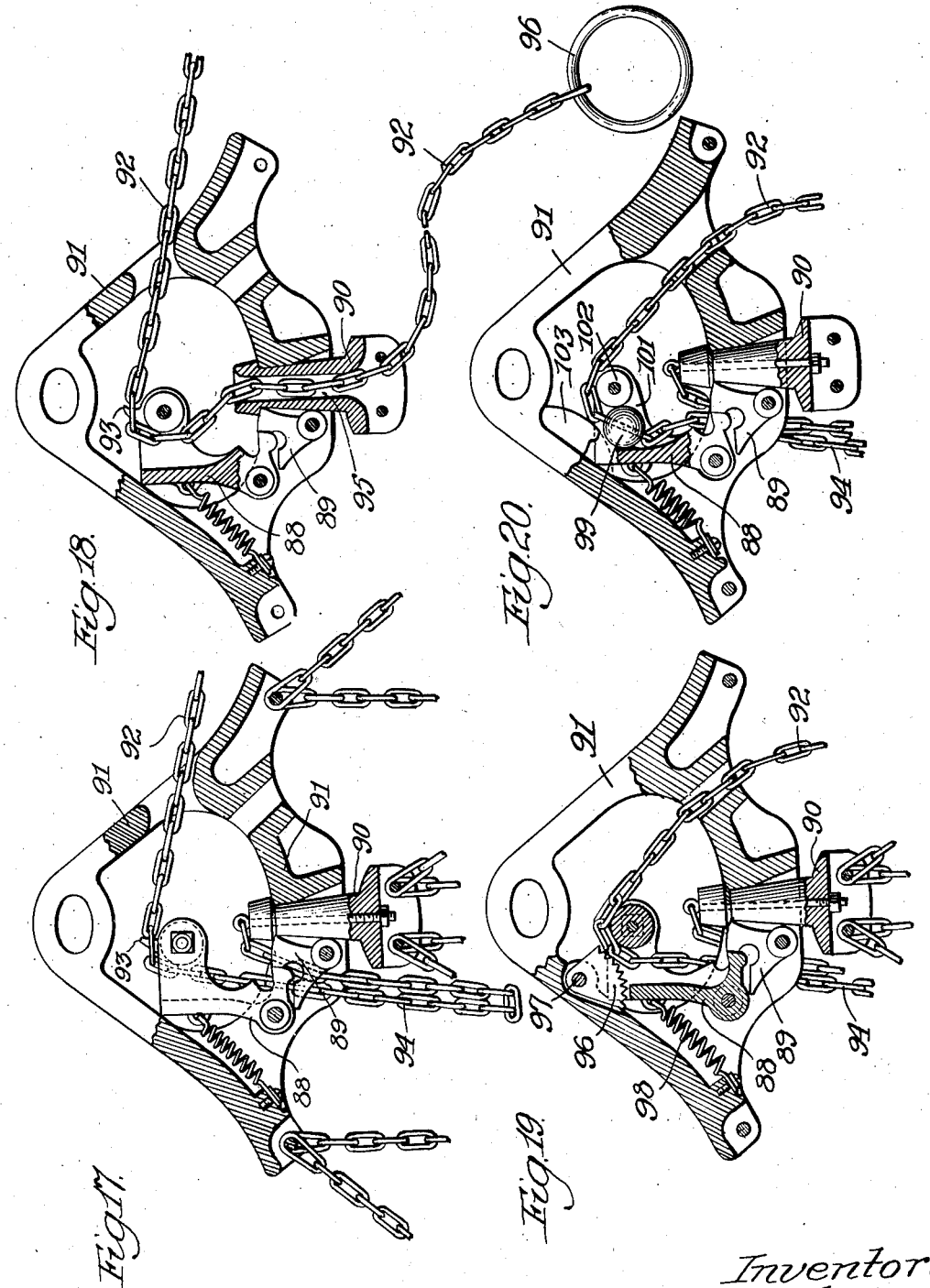

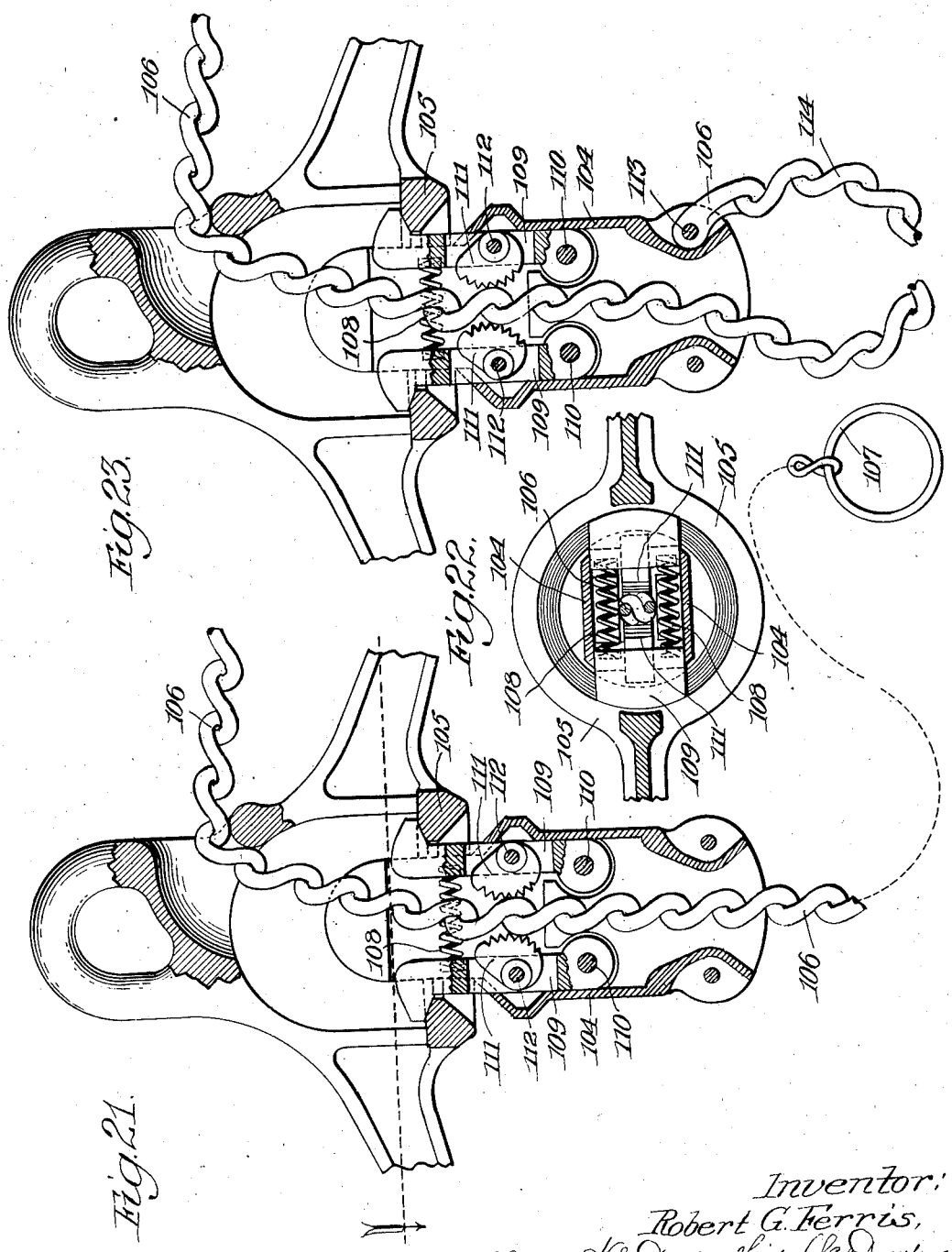

July 14, 1942.  R. G. FERRIS  2,289,769
GRAPPLE FORK
Filed Nov. 30, 1940  7 Sheets-Sheet 7
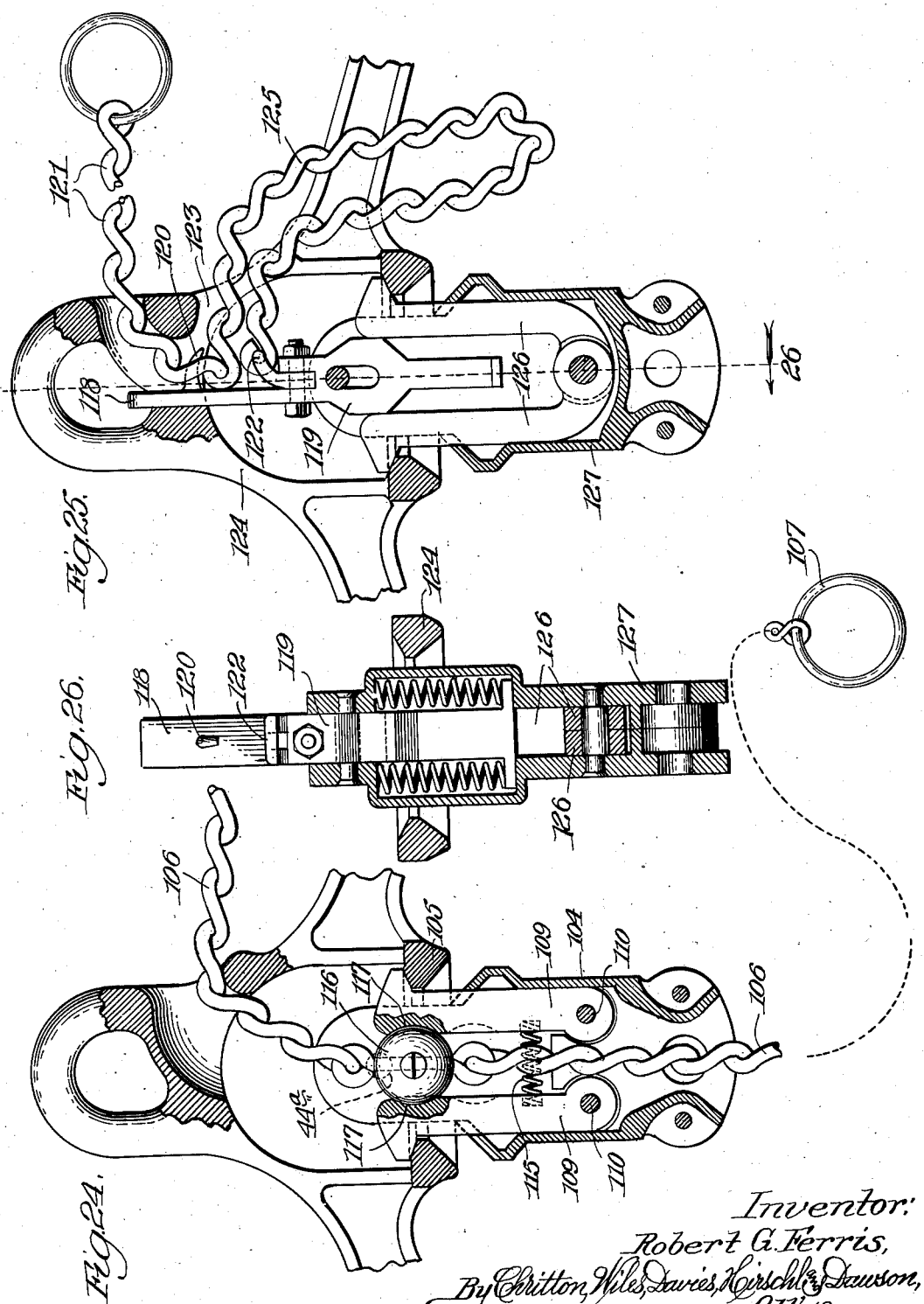
Inventor:
Robert G. Ferris,
By Critton, Wiles, Davies, Hirschl & Dawson,
Attys.

Patented July 14, 1942

2,289,769

UNITED STATES PATENT OFFICE 2,289,769

GRAPPLE FORK

Robert G. Ferris, Harvard, Ill., assignor to Starline, Inc., a corporation of Illinois Application November 30, 1940, Serial No. 368,063

10 Claims. (Cl. 294—109)

My invention relates to grapple forks for use more particularly in shifting hay from one location to another, as for example from a wagon into a loft, or vice versa, and comprising separate tine sections located at opposite sides of the fork and adapted to be manipulated toward each other into carrying engagement with the hay to pick up a load thereof and away from each other to drop the load.

The invention relates more especially to that type of grapple forks in which the tine sections are connected toward their outer ends with a head and inwardly of their points of connection with the head, with a member, as for example, and more particularly, a swivel, having releasable connection with the head under the control of the operator.

In this type of grapple fork the stress of the loaded fork in load-carrying position is taken through the swivel and its connections with the tine sections, the swivel in this position being releasably connected with the head; and upon releasing the swivel from the head the stress of the load is transferred from the swivel to the connections between the head and the tine sections, the tine sections in this operation automatically swinging outwardly to drop the load.

The member to which the inner ends of the tine sections are connected is customarily a swivel inasmuch as the inner ends of the tine sections in the suspended non-loaded condition, mutually overlap, whereas when the tine sections are spaced apart to apply them to the hay to be lifted, their inner ends move out of overlapped position to a position in which they are spaced apart; and by employing a swivel the tine sections may be swung into and out of the overlapped position as stated, without cramping or other interference.

Furthermore, it is customary to employ a trip rope controlled by the operator for effecting the release of the swivel from the head to drop the load; and in some constructions provision has been made for returning the swivel to interlocked position on the supporting member by means of this same rope, in order that the grapple device may be readily manipulated, in suspended condition (after the load has been dropped), into a position in which the tine sections are closed, namely, in which the extremities of the tine sections instead of projecting downwardly, extend in a general horizontal direction and thereby reduce the menace of the grapple fork injuring anyone against whom it may be lowered.

Such constructions, however, have presented the objection that as soon as the swivel is released from the head very severe stress is imposed on the hand rope producing violent jerking of the rope while the operator is holding it, the jerk being so severe as to oftentimes lift the operator off his feet, and thus constitute a great menace to the operator.

My object generally stated is to produce improvements in grapple forks of the general type above referred to, to the end of rendering them better adapted for performing their intended purpose; and especially to provide a grapple fork of the character employing a pull rope for performing the tripping function as well as the re-setting function above referred to, by which these functions may be performed without imposing any objectionable stress on the pull rope in the manipulation thereof.

Referring to the accompanying drawings:

Figure 1 is a view in side elevation of a grapple fork constructed in accordance with my invention, the structure being shown in a position it may assume upon starting to lift a load.

Figure 2 is a plan view of the structure shown in Fig. 1 with the parts of the fork in the same positions illustrated therein.

Figure 3 is an enlarged, detailed view, in sectional elevation, of the central portion of the structure shown in Figs. 1 and 2, with the several parts shown in the same positions as in Figs. 1 and 2.

Figure 4 is a fragmentary elevational view of certain of the parts shown in Fig. 3.

Figure 5 is a fragmentary sectional view, the section being taken at the line 5 of Fig. 4 and viewed in the direction of the arrow.

Figure 6 is an inner end view of one of the two similar sections composing the head of the device.

Figure 7 is a fragmentary sectional view taken at the line 7 on Fig. 4 and viewed in the direction of the arrow.

Figure 8 is a view like Fig. 3 and of the parts shown therein, illustrating positions assumed thereby immediately following the actuation of the mechanism shown, from the position illustrated in Fig. 3, to load-releasing position.

Figure 9 is a view like Fig. 1 and of the parts shown therein, illustrating the positions assumed by the parts of the device after the load has been dropped.

Figure 10 is a view like Fig. 9 and of the parts shown therein, illustrating the positions assumed by the parts after the device is conditioned for lowering it into a position to pick up a load.

Figure 11 is a view like Fig. 3 showing a modification embodying the invention.

Figure 12 is a view like Fig. 3 showing another modification embodying the invention.

Figure 17 is a view like Fig. 3 of another modification of the invention embodying the invention.

Figure 18 is a view like Fig. 3 of another modification of the invention embodying the invention.

Figure 19 is a view like Fig. 3 of another modification of the invention embodying the invention.

Figure 20 is a view like Fig. 3 of another modification of the invention embodying the invention.

Figure 21 is a view like Fig. 3 of another modification of the invention embodying the invention.

Figure 22 is a sectional view taken at the line 22 on Fig. 21 and viewed in the direction of the arrow.

Figure 23 is a view like Fig. 3 of another modification of the invention embodying the invention.

Figure 24 is a view like Fig. 3 of another modification of the invention embodying the invention.

Figure 25 is a view like Fig. 3 of another modification of the invention embodying the invention; and Figure 26, a sectional view taken at the line 26 on Fig. 25 and viewed in the direction of the arrow.

Figure 13:
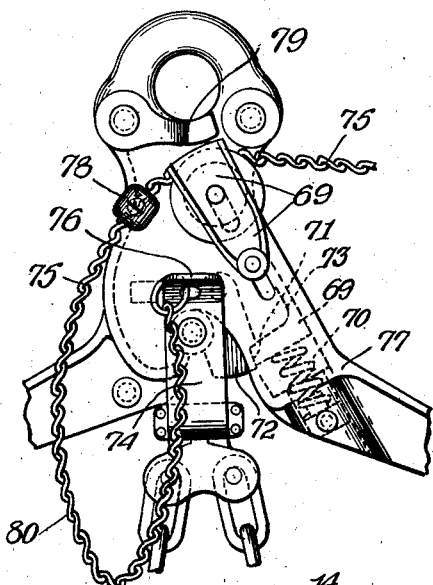
Figure 13 is a view like Fig. 3 showing another modification embodying the invention.

Referring to the construction shown in Figs. 1–10, inclusive, the grapple fork illustrated and in connection with which I have chosen to illustrate my invention, comprises two tine sections 27 each shown as formed of two curved spaced apart tines 28 provided on the outer ends of bar portions 29 extending at an angle thereto, the bar portions 29 being connected together at their inner ends as represented at 30 and adjacent the tines 28 by a bar represented at 31.

The construction shown also comprises a head 32 to the opposite ends of which chains 33, connected with the tine sections 27 between their ends as represented at 34, are secured as represented at 35.

Chains 36 connected at their outer ends with the inner ends of the tine sections 27 as indicated at 37, are connected at their inner ends with spaced apart lugs 38 provided on the lower end of a swivel 39 having an opening 40 extending vertically therethrough. The swivel 39 terminates at its upper end in an enlargement 41 presenting an upwardly extending frusto conical portion 42 having a relatively slight angle of taper, and a downwardly extending frusto conical portion 43 having an abrupt angle of taper.

The head 32 is shown as formed of a pair of similar sections 44 at which the chains 33, respectively, connect with the head; the head sections 44 being provided adjacent their upper ends at opposite sides of the head, with inwardly extending overlapping apertured ears 45 through which pins 46 for pivotally connecting the sections 44 together, extend; these pins being carried by ears 47 depending from a clevis 48 which extends downwardly into a position between the head sections 44 through openings 49 in the top of the head.

The opposing surfaces of the head sections 44 are laterally expanded as represented at 50 and their inner surfaces throughout the height of the head are circularly recessed as shown.

The opposing extension portions of the head sections 44 above the ears 45 and represented at 51, are cut back as represented at 52, whereby these head sections are adapted to have limited swinging movement about the pivoting pins 46.

As clearly shown in Figs. 3 and 8 the recessing of the head sections as referred to is such as to provide two opposing approximately semi-circular halves 53 of a circular flange projecting into the recess in the head, this flange presenting a downwardly flaring annular surface 54 at the lower extremity of the head 32, the angle of flare of this surface being approximately the same as that of the upper frusto conical surface 42 of the swivel 39. This flange, above the surface 54, also presents an upwardly flaring annular surface, or ledge, 55 for interlocking engagement with the swivel 39 as hereinafter described, the angle of flare of the surface 55 being approximately that of the lower abrupt frusto conical surface 43 of the swivel, the wall of the recess in the head above the surface 55 sloping upwardly and inwardly to a less diameter than that of the swivel enlargement 41 to prevent accidental upward withdrawal of the swivel from the head.

The construction also comprises a chain 56 which extends through, and is slidable in, the head 32 and swivel 39. This chain is provided with a block 57 fixedly secured thereto and adapted to enter downwardly into the space between the upper extensions 51 of the head sections 44 as shown in Fig. 3 when these head sections are in the closed position shown in this figure, and prevent swinging of the head sections outwardly at their lower ends until the block is withdrawn from the head. The walls of the recesses in the extensions 51, below the upper extremities of the latter, are inwardly bulged, as represented at 58, to form stops limiting the downward movement of the block 57 and chain 56.

The lower end of the chain 56 is provided with an enlargement, shown as in the form of a ring 59, which forms an abutment for engagement with the swivel 39, more particularly for the lifting of the swivel into interlocked relation to the head 32, upon manipulating the chain 56, as hereinafter described.

The grapple fork is shown as associated with hoisting and conveying mechanism as commonly provided with forks of this kind, this mechanism comprising block and tackle mechanism 60 connected with the clevis 48 and which in practice may be supported to depend from a carrier (not shown) movable along a track (not shown) as is common in hay carrier apparatus.

The operation of the fork is as follows: Assuming the fork to be in lowered position with the swivel 39 interlocked with the head 32 (in which position the swivel rests at its surface 43 upon the ledge 55 of the head 32), the block 57 entered between the extensions 51 of the head sections 44 as shown in Fig. 3, and the inner end of the chain 56 drawn down to the position shown in Fig. 1 wherein the ring 59 is spaced a considerable distance below the swivel 39; the operator, to load the fork, manipulates the independently movable tine sections 27 into the desired positions in the mass of hay for picking up the desired load, the tines 28, in substantially vertical position, being forced downwardly by the operator into the hay.

Upon positioning the tine sections as stated, the hoisting mechanism is operated to grapple and elevate a load of hay. Inasmuch as the swivel 39 is interlocked with the head 32 and the block 57 is in locking position, the lifting force exerted by the hoisting mechanism is exerted on the tine sections 27 at their connections with the chains 36, whereby the tine sections, in the initial movement of the hoisting mechanism, swing inwardly at their tines 28, toward the mass of hay between the tines causing a load of hay to become cradled in the fork, in carrying position; and in the continuing operation of the hoisting mechanism the fork with its load is lifted.

Upon reaching the point at which the load is to be dropped, the operator pulls on the upper end of the chain 56 to withdraw the block 57 from engagement with the head sections 44, whereupon, due to the load on the swivel 39, the swivel disengages from the head and the load is free to exert a spreading action on the tines 28 of the respective tine sections 27 causing the load to drop from the fork, the parts of the fork in this operation assuming the positions substantially as represented in Fig. 9, in which the inner ends of the tine-sections 37 move to mutually overlapped position as shown. As will be understood, the swivel 39 upon disengaging from the head 32 as stated, runs down on the chain 56 to, or substantially to, the ring 59, and in such movement the support for the tine sections 27 shifts from the chains 36 to the chains 33, thereby avoiding jerking action on the chain 56 in the load dropping operation.

Following the dumping of the load and while the fork is in elevated position, the operator pulls on the upper end of the chain 56 to shift it from the position shown in Fig. 9 to that shown in Fig. 10 which causes the swivel 39 to be raised, by engagement of the ring 59 therewith, and again become locked to the head 32 (Fig. 10); in which operation the tine sections 27 are caused to swing into the closed position shown in Fig. 10 in which position the tines extend into the desired substantially horizontal position to reduce danger to the workmen standing beneath the fork, in the lowering of the fork.

The fork, to pick up another load, is lowered, with its tines in the position shown in Fig. 10, to the hay to be elevated and the operation first above described repeated; in which operation the tine sections 27 move out of mutually overlapped position, during which movement the swivel 39 turns on the head.

Prior to the application of hoisting stress to the fork in picking up this new load, preferably while the fork is in elevated position, the operator, grasping the ring, pulls the chain 56 downwardly through the head 32 and swivel 39 to enter the block 57 between the extensions 51 of the head 32 which, in this condition of the device are in the position shown in Fig. 3, the ring 59 becoming spaced below the head 32 as shown in Fig. 9.

It may here be stated that the angularity of the surface 43 of the swivel 39 and the surface 55 of the head 32, is such that the swivel is held interlocked with the head in the non-loaded condition of the fork (Fig. 10) regardless of the position of the block 57, the stress exerted by the swivel and the parts exerting downward pull thereon, being insufficient to cause the head sections 44 to spread apart to swivel-releasing position against the force exerted by the weight of the fork acting through the chains 33 against the ends of the head sections 44 and operating to hold the head sections in closed position. The angularity of the surfaces 43 and 55, however, is such that the downward stress on the swivel 39, when the fork is loaded, is such as to readily cam the head sections 44 to swivel-releasing position unless prevented from doing so by the engagement of the block 57 with the head-extensions 51 as above described.

As shown in the drawings the bail 61 of the clevis is set at an angle preferably a 45° angle to the plane of the head-sections 44. This is a very desirable feature of a construction of this character as it permits the operator to take the load from a wagon with the fork positioned either lengthwise or crosswise of the wagon and carry and release the load, without rotating it, it being noted that the disposing of the bail 61 as stated removes the bail from a position in which the chain 56, whether the load has been picked up lengthwise or crosswise of the wagon, pulls around, and against, the bail with a tendency to rotate the fork.

Referring to Fig. 11, the modification shown therein, instead of providing for the sliding of the swivel 39 on the chain, represented at 62 (corresponding with the chain 56 of the preceding figures of the drawings,) in the load dropping operation to prevent jerking the chain, involves the provision of slack in the chain 62 between the swivel 39 and the means locking the swivel in load carrying position and involving the block 57.

All of the parts of this construction are the same as those shown in Figs. 1 to 10, inclusive, except that the lower end of the chain 62 is connected with the swivel 39 as by a cotter-pin 63 and provision is made for looping, as represented at 64, the part of the chain 62 between the cotter 63 and the block 57, through an opening 65 formed in one of the head sections 44, this loop being of such length that when the swivel 39 is released by withdrawing the block 57 upwardly from the locking position shown it will permit the swivel to drop without jerking the operator.

As will be understood, the swivel 39 is returned to locked position by pulling on the upper end of the chain 62 to interlock the swivel with the head sections 44, and before hoisting stress, by picking up a load, is exerted on the swivel 39 the operator pulls the slack 64 into the chain and seats the block 57 in the locking position shown.

The construction shown in Fig. 12 is the same as that shown in Figs. 1 to 10, inclusive, except that instead of providing the block 57 on the chain 56 to hold the head sections 44 interlocked with the swivel 39, the head sections are provided above their pivot 46 with serrated cam shaped dogs 66 pivoted at 67 to the upper ends of the head sections. These dogs when turned as by the handle levers 68 connected therewith to the positions shown, grip the chain 56 and hold the sections 44 interlocked with the swivel 39; and are rotated, to permit the swivel 39, when carrying a load, to disengage from the head sections 44, when the operator pulls on the upper end of the chain 56. As will be understood, the upper end of the chain is pulled to return the swivel 39 to locked position relative to the head sections 44 following which the operator pulls the lower end of the chain through the head and the swivel 39, to position the stop ring 59 in spaced relation below the swivel as in Fig. 1 and then rotates the dogs 66 into chain-engaging position (Fig. 12).

Manifestly, instead of providing for the sliding of the swivel 39 on the chain, the chain may be connected to the swivel as in Fig. 11 and the jerking action on the chain avoided by throwing a loop into the chain as explained of the construction shown in Fig. 11.

The construction shown in Figs. 13-16, inclusive, constitute modifications of the construction shown in the Johnson United States Letters Patent No. 2,103,370, granted December 28, 1937, incorporating my invention therein.

The construction shown in Fig. 13 is the same as that shown in Patent No. 2,103,370 except that instead of actuating the slide device 69, backed by the coil spring 70, to withdraw the stop portion 71 on the slide from engagement with the rocking latch member 72 and permit this latch member to enter the recess 73 in the slide device 69 and release the swivel 74 while carrying a load, by pulling on the chains 75 to render them taut from the points at which they are grasped by the operator to the points at which they connect with the ears 76 of the swivel 74, the slide bar 69 is actuated for the purpose stated by providing blocks on the chains 75 and abutments on the head 77 (one of the blocks being shown at 78 and its cooperating abutment at 79) in such position that when the chains 75, positioned as shown in Fig. 13, are pulled at their outer ends the blocks 78 will wedge in between the abutments 79 and the upper end of the slide member 69 forcing the latter to a position in which the latch 72 is released to permit the swivel 74 to drop, in which operation the blocks 78 pass outwardly beyond the head 77 at its right-hand side.

In this modified construction the swivel 74, after the load is dropped, is raised to interlock with the head 77 by the latch 72, by pulling on the upper ends of the chains 75, and following this locking operation the operator pulls these chains reversely throwing loops into the chains as shown of the one chain at 80 in which position the blocks 78 extend in the position shown in Fig. 13; it being understood that the loops 80 would be of such length that jerking of the operator, upon the dropping of the swivel 74 to release the load, will not occur.

Figure 14:
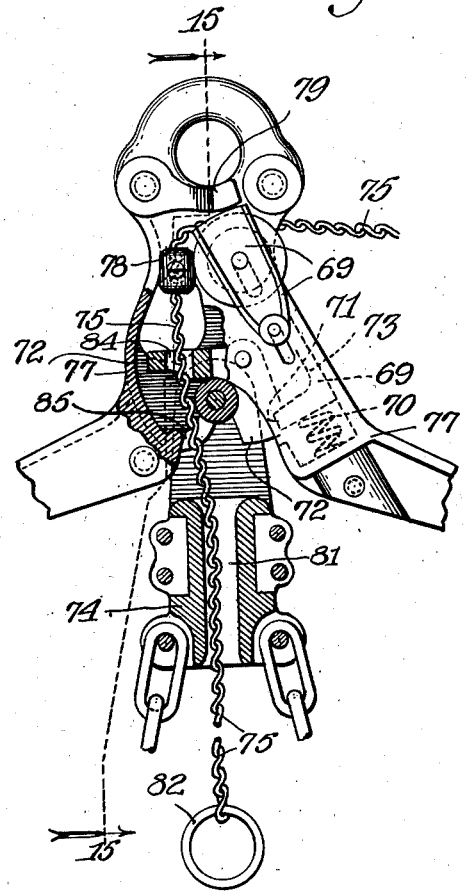
Figure 14 is a view like Fig. 3 showing another modification embodying the invention, the section being taken at the irregular line 14 on Fig. 15 and viewed in the direction of the arrow.

Fig. 14 is of the same construction as that shown in Fig. 13 except that instead of providing for the looping of the chains as explained of Fig. 13, the swivel 74 freely slides on the chains 75 in dropping, upon release when loaded. Accordingly a hole 81 through the swivel 74 is provided and the inner ends of the chains provided with a stop ring 82, depend through this hole; the chains 75 at the portions thereof below the blocks 78 pass inwardly freely through side openings 83 in the head 77 and thence downwardly through an opening 84 provided in the latch member 72 and an opening 85 in the part of the head 77 which cooperates with the latch member 72 to hold the swivel 74 in locked position.

Figure 15:
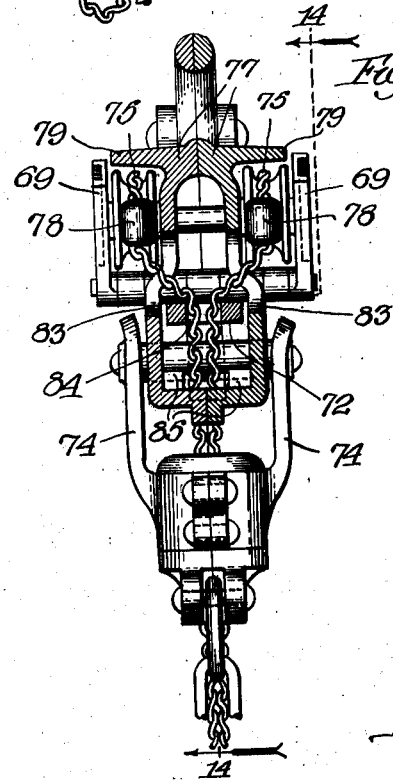
Figure 15 is a sectional view taken at the irregular line 15 on Fig. 14 and viewed in the direction of the arrow.

As will be understood, when the swivel 74, in loaded condition, is released from the head 77 by pulling the blocks 78 between the abutments 79 and the slide member 69, the swivel will slide downwardly on the chains 75 without jerking the operator, the swivel 74 being raised to interlock with the head 77 by pulling on the outer ends of the chains 75, following which the operator pulls on the inner ends of these chains to restore them to the position shown in Figs. 14 and 15 in which the blocks 78 extend as shown, thus repositioning the parts for the release of the swivel 74 following the next loading thereof.

Figure 16:
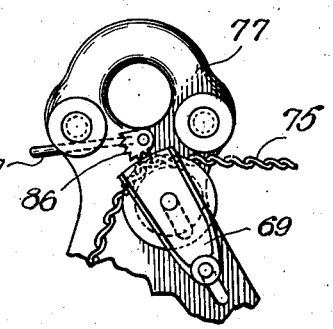
Figure 16 is a view like Fig. 3 of another modification embodying the invention.

The construction shown in Fig. 16 is representative of either of the constructions shown in Fig. 13 and in Figs. 14 and 15, modified as to the means controlling the movement of the slide member 69 to permit the locking member 72 to move for releasing the swivel 74. In this construction instead of actuating the slide member 69 by means of the blocks 78 of Figs. 13-15, it is actuated by means of serrated dogs one of which is shown at 86, pivoted on the head 77 and having a handle lever 87.

The dogs 86 engage the chains 75 in the raised locked position of the swivel 74 and when it is desired to release the swivel to drop the load, the operator pulls on the outer ends of the chains 75 thus causing the dogs 86 to rotate and force the slide member 69 to a position for permitting the latch member 72 to swing out of swivel locking position.

The swivel 74 is raised to lock it to the head 77 by pulling on the upper ends of the chains 75, the slide member 69, because of the weight imposed on the chains 75, lowering sufficiently to permit the chains 75 to clear the dogs 86. Following the locking of the swivel 74 to the head 77 the operator either throws loops into the chains 75 as in the construction shown in Fig. 13 or pulls the chains downwardly through the swivel 74 as in the case of the construction shown in Fig. 14, and then throws the dogs 86 into the position shown in Fig. 16 to recondition the parts for the next release of the loaded swivel.

The construction shown in Figs. 17-20, inclusive, constitute modifications of the constructions shown in the Lantz United States Patent No. 2,155,137, granted April 18, 1939, incorporating my invention therein.

The construction shown in Fig. 17 is the same as that shown in Patent No. 2,155,137 except that instead of actuating the pivoted lever 88 which controls the swivel-locking pawl 89 to release the swivel 90 from the head 91 while carrying a load, by pulling on the chain 92 to render it taut from the point at which it is grasped by the operator to the point at which it connects with the swivel, the lever 88 is actuated, for the purpose stated, by providing a tooth 93 on this lever which extends into a loop of the chain 92 so that when this chain is positioned as shown in Fig. 17 and is pulled at its outer end the lever 88 will be rocked to release the locking pawl 89 from the swivel 90 and permit the loaded swivel to drop without jerking the operator, by reason of the provision of the slack provided in the chain as represented at 94.

In this modified construction the swivel 90, after the load has been dropped, is raised to interlock with the head 91 by pulling on the outer end of the chain 92 and following this locking operation the operator pulls the chain reversely throwing the loop 94 into the chain in which looped position the operator hooks the chain 92 over the tooth 93 as shown in Fig. 17, this loop being of a length as explained of the construction shown in Fig. 11.

The construction shown in Fig. 18 is the same as that shown in Fig. 17 except that instead of providing for the looping of the chain 92, as explained of the construction shown in Fig. 17, the swivel 90 is apertured at 95 to receive the chain 92 on which the swivel slides in dropping upon release, when loaded, from the head 91, the lower end of the chain 92 being provided with a stop ring 96 corresponding with the stop ring 59 of Figs. 1-10.

When the swivel 90, in loaded condition, is released from the head 91 by pulling on the outer end of the chain 92 which, through its engagement with the tooth 93, rocks the pawl 89, the swivel 90 will drop, sliding down on the chain 92 without jerking the operator. Following the dumping of the load the operator pulls on the outer end of the chain 92 to lift the swivel 90, by means of the stop ring 96, into interlocked relation to the head 91. He then reversely pulls the chain 92 to cause the stop ring 96 to be spaced below the swivel 90 and then hooks the chain 92 over the tooth 93, thus restoring the parts to a position in which the swivel 90 may be released for dropping the next load, by pulling on the outer end of the chain 92.

The construction shown in Fig. 19 is the same as that shown in Fig. 17 except that instead of providing the tooth 93 for interlocking with the chain 92, I provide an eccentric serrated dog 96 pivoted at 97 to the head 91 and adapted to clamp the chain 92 against the lever 89 and actuate the latter to swivel releasing position when the outer end of the chain 92 is pulled.

In this construction I provide for the looping of the chain by the operator as indicated at 94 in the locked position of the swivel 90, as in the case of the construction shown in Fig. 17.

In the raising of the swivel 90 to locked position by pulling on the outer end of the chain 92 the lever 88 swings, against the action of the spring 98, clear of the dog 96 to permit such action to take place.

The construction shown in Fig. 20 is the same as that shown in Fig. 17 except that instead of providing the tooth 93 for interlocking with the chain 92, I provide a ball 99 on the chain 92 in such position that when the loop 94 is thrown into the chain the pawl is disposed in the lever 88 between the back wall 100 of its bifurcated portion 101 and the pulley 102 over which the chain 92 runs, and provide on the head 91 a cam abutment 103 in the path of movement of the ball 99 when the outer end of the chain 92 is pulled, operating to force the ball 99 to the right against the pulley 102, and in passing against the latter, rocking the lever 88 to release the swivel 90, the ball 99 passing beyond the pulley 102 in this operation.

Following the raising of the swivel 90 to locked position by pulling on the outer end of the chain 92, the operator throws the loop 94 into the chain, positioning the ball 99 as shown in Fig. 20 preparatory to the next operation of releasing the swivel on taking the next load.

Manifestly, the dog feature of Fig. 19 and the ball feature of Fig. 20 could be used in a structure in which the swivel slides on the chain as in the construction shown in Fig. 18, instead of providing for the throwing of a loop into the chain.

The construction shown in Figs. 21 to 26, inclusive, constitute modifications of the construction shown in the Zehner United States Letters Patent No. 2,135,930, granted November 8, 1938, incorporating my invention therein.

The construction shown in Figs. 21 and 22 is the same as that shown in Patent No. 2,135,930 except that the cam bar controlling the release of the lock member, herein shown at 104, from the head indicated at 105 and operated by a pull chain, and the springs urging this cam bar toward locking position, are omitted; the controlling chain shown at 106 extends slidingly through the lock member 104 as well as the head 105 and terminates at its lower end in a ring 107, and springs 108 between, and bearing at opposite ends against, the lock levers represented at 109 and pivoted at 110 to the lock member 104 and eccentric serrated dogs 111 pivoted at 112 in the lock levers 109 and adapted to clamp the chain 106 between them, are provided.

In the position of the parts as shown in Figs. 21 and 22, wherein the ring 107 extends below the locked lock member 104 and is spaced therefrom the desired distance to avoid jerking the operator when the lock member 104, upon release, drops on the chain 106 under the weight of the load, the dogs 111, engaging the chain 106, hold the lock levers 109 in engagement with the head 105 and therefore the lock member 104 in interlocked relation to the head.

To release the lock member 104 to permit it to drop on the chain 106 and drop the load, the operator pulls on the outer end of the chain thus rotating the dogs 111 to permit the lock levers 109 to swing inwardly against the resistance of the springs 108 and disengage from the head 105.

The lock member 104 is raised to interlock it with the head 105 by pulling on the outer end of the chain 106, following which operation the operator reversely pulls on the lower end of the chain to pull it in the head 105 and lock member 104 to the position shown in Fig. 21; the operator during this reverse movement of the chain holding the dogs 111 in retracted position as by means of handle levers (not shown) connected with these dogs which latter, when freed from restraint, swing to the position shown in Fig. 21.

The construction shown in Fig. 23 is the same as that shown in Figs. 21 and 22 except that instead of providing the ring on the chain 106 which extends in spaced relation to, and below, the lock member 104 in the locked position of the lock member before picking up a load, as explained in connection with the construction shown in Figs. 21 and 22, the lower end of the chain 106 is attached to the lock member 104, as at 113 and jerking of the operator by the dropping of the load is avoided by the operator throwing a loop 114 into the chain 106 after the lock member 104 has been lifted by this chain into interlocked position relative to the head 105, the dogs 111 being thrown by the operator to the position shown for release of the lock member 104 from the head 105 by pulling on the outer end of the chain 106 in the next load releasing operation.

The construction shown in Fig. 24 is substantially the same as that shown in Fig. 21 except that the dogs 111 and springs 108 of Fig. 21 are omitted. Springs 115 locked at opposite sides of the chain 106 and functioning as in the case of the springs 108 of Fig. 21 are provided between the lock levers 109 adjacent their pivots 110, and the chain 106 is provided with a ball 116 adapted to be entered between the upper ends of the lock levers 109 and extend into sockets 117 therein for holding the lock levers 109 engaged with the head 105 in the locked loaded position of the lock member 104, the ball 116 being so positioned as shown that when in locking position the ring 107 will extend to the desired distance between the lock member 104 for avoiding jerking of the operator when the loaded lock member 104 is released from the head 105.

The loaded lock member 104 is released to drop the load by pulling on the outer end of the chain 106 to move the ball 116 out of engagement with the lock levers 109 and the lock member 104 is raised to lock it to the head 105 by pulling on the outer end of the chain 106, following which operation the operator reversely pulls the chain 106 through the head 105 and lock member 104 to the position shown, the ball 116 becoming seated between the lock levers 109 for the purpose stated.

Manifestly the construction shown in 24 may be converted into one which provides against jerking of the operator, by throwing a loop into the chain as shown in Fig. 23, by merely attaching the lower end of the chain 106 to the head 105 as indicated of the chain in Fig. 23.

The construction shown in Figs. 25 and 26 is the same as that shown in Patent No. 2,135,930 except I provide an upward extension 118 on the spring controlled cam bar herein shown at 119, and provide a tooth 120 on this extension over which the chain shown at 121 is adapted to be hooked as indicated; connect the lower end of the chain 121 to the cam bar 119 as indicated at 122 and provide an opening 123 in the side of the head herein shown at 124 through which a loop 125 thrown into the chain may extend.

In the position of the parts as shown in Fig. 25, wherein the cam bar 119 is in a position in which it restrains the pivoted lock levers, herein shown at 126, from disengaging from the head 124, and the loop 125 is thrown into the chain, the chain is hooked over the tooth 120 as shown. To release the lock member shown at 127 and carrying the lock levers 126, to drop the load, the operator pulls on the outer end of the chain 121 thus lifting the cam bar 119 through the engagement of the chain with the tooth 120 and releasing the lock member 127 from the head 124 and permitting the load to be dropped.

The operator, to raise the lock member 127 to lock it to the head 124, pulls on the other end of the chain 121 following which operation the operator reversely pulls on the chain to form the loop 125 of a length sufficient to prevent jerking the operator upon the next release of the lock member 127 from the head 124, and hooks the chain over the tooth 120 as shown in Fig. 25.

As will be apparent the weight of that portion of the trip rope which extends away from the head of the fork, exerts a tendency to release the means which support the load during the carrying of the load by the fork, as for example in the case of the construction shown in Figs. 1–8 the tendency is to release the block 57 by withdrawing it from between the upper ends of the head sections 44. While this tendency is not sufficient to prematurely release the load under ordinary conditions, it may be sufficiently great under other conditions, such as for example in the case of a light load, as for instance in the picking up of the remnant of hay from the wagon to which the hay is delivered to the barn and/or where an excessive length of the trip rope depends from the fork as in the case of loading the hay into a barn of extra great height or into an extra long barn even when of relatively low height, as to require, for insuring the carrying of the load to the intended destination, the provision of means which will positively prevent such premature release of the load.

I have therefore provided means for this purpose, illustrated by way of example in connection with the construction shown in Figs. 1–8, inclusive, Fig. 11 and Fig. 24. In Figs. 1–8 these means are shown in the form of yieldable detents 44a mounted in the clevis 48 to extend inwardly into the path of upward movement of the block 57 when the block is in the position shown in Fig. 3 which is the position of the block during the lifting of a load, these detents being sufficiently resistant to prevent the release of the block under the weight of the trip rope under all conditions, but sufficiently yielding to permit the block to be drawn by the trip rope when actuated by the operator, to released position when it is desired to drop the load.

The detents shown comprise socket members 44b secured in openings in the clevis 48 and detents proper 44c, having stems 44d, slidable into the socket members 44b and urged into a position in which they extend into the path of upward movement of the block 57, by coil springs 44e surrounding the stems 44d and interposed between the detents proper 44c and the bases of the socket members 44b.

The constructions shown in Figs. 11 and 24 also embody means for preventing accidental release of the load under the weight of the trip rope, the means shown for this purpose being yieldable detents represented at 44a secured to the clevises of the forks, to extend into the path of upward movement of the blocks 57 and 116, respectively, and shown as of the same construction as the detents 44a of Figs. 1–8.

While I have illustrated and described certain particular constructions embodying my invention I do not wish to be understood as intending to limit it thereto as the same may be variously modified and altered and the invention embodied in other forms of structure, without departing from the spirit of the invention.

What I claim as new and desire to secure by Letters Patent, is:

1. A grapple fork comprising tines, a head, means connecting said tines to said head, a member and means connecting said tines inwardly of their points of connection with said first-named means, to said member, releasable locking means for holding said member to said head, an actuating element movable lengthwise relative to said head and member and controlling the release of said locking means, and means on said element for returning said member to a position in which it becomes locked to said head upon actuating said element, said last-named means extending in vertically spaced relation to said member upon the release of said locking means by said element.

2. A grapple fork comprising tines, a head formed of pivotally connected sections adapting them to move into and out of closed position, means connecting said tines to said head sections, respectively, below the pivotal connection between said sections, a member below said pivotal connection, means connecting said tines inwardly of their points of connection with said first-named means, to said member, said head sections and said member having mutually interlocking portions operative in the closed position of said head sections to lock said member to said head, an actuatable element, and means on said element for holding said head sections in closed position in one position of said element and adapted to release said head sections when moved out of such position, said member being returnable to a position in which it becomes locked to said head by actuating said element, said member being operative in its movement from released position without exerting jerking action on the portion of said element at which force is applied thereto for releasing said member from said head.

3. A grapple fork comprising tines, a head, means connecting said tines to said head, a member and means connecting said tines inwardly of their points of connection with said first-named means, to said member, said head sections and said member having mutually interlocking portions operative in the closed position of said head sections to lock said member to said head, an actuatable element, said head sections in the closed position presenting spaced apart portions, a block on said element adapted to engage said portions of said head sections and hold said head sections in closed position in one position of said element and adapted to release said head sections when moved out of such position, said member being returnable to a position in which it becomes locked to said head by actuating said element, said member being operative in its movement from released position without exerting jerking action on the portion of said element at which force is applied thereto for releasing said member from said head sections.

4. A grapple fork comprising tines, a head formed of pivotally connected sections adapting them to move into and out of closed position, means connecting said tines to said head sections, respectively, a member and means connecting said tines inwardly of their points of connection with said first-named means, to said member, said head sections and said member having mutually interlocking portions operative in the closed position of said head sections to lock said member to said head operative to resist release of said member in the unloaded condition of the fork and, unless restrained, to permit release of said member in the loaded condition of the fork, an actuatable element, and means on said element for holding said head sections in closed position in one position of said element, said member being returnable to a position in which it becomes locked to said head by actuating said element, said member being operative in its movement from released position without exerting jerking action on the portion of said element at which force is applied thereto for releasing said member from said head sections.

5. A grapple fork comprising tines, a head, means connecting said tines to said head, a member and means connecting said tines inwardly of their points of connection with first-named means, to said member, releasable locking means for holding said member to said head, an actuating element movable lengthwise relative to said head and member, means on said element for holding said locking means in locking position in one position of said element, and means on said element for returning said member to a position in which it becomes locked to said head upon actuating said element, said last-named means extending in vertically spaced relation to said member when said fourth-named means are in operative position, for the purpose set forth.

6. A grapple fork comprising tines, a head, means connecting said tines to said head, a swivel and means connecting said tines inwardly of their points of connection with first-named means, to said swivel, releasable locking means for holding said swivel to said head, an actuating element movable lengthwise relative to said head and swivel, means on said element for holding said locking means in locking position in one position of said element, and means on said element for returning said swivel to a position in which it becomes locked to said head upon actuating said element, said last-named means extending in vertically spaced relation to said swivel when said fourth-named means are in operative position, for the purpose set forth.

7. A grapple fork comprising tines, a head formed of pivotally connected sections adapting them to move into and out of closed position, means connecting said tines to said head sections, respectively, a member and means connecting said tines inwardly of their points of connection with said first-named means, to said member, said head sections and said member having mutually interlocking portions operative in the closed position of said head sections to lock said member to said head, an actuating element movable lengthwise relative to said head and member, means on said element for holding said head sections in closed position in one position of said element, and means on said element for return of said member to a position in which it becomes locked to said head upon actuating said element, said last-named means extending in vertically spaced relation to said member when said third-named means are in operative position, for the purpose set forth.

8. A grapple fork comprising tines, a head formed of pivotally connected sections adapting them to move into and out of closed position, means connecting said tines to said head sections, respectively, below the pivotal connection between said sections, a member below said pivoted connection and means connecting said tines inwardly of their points of connection with said first-named means, to said member, said head sections and said member having mutually interlocking portions operative in the closed position of said head sections to lock said member to said head, an actuating element movable lengthwise relative to said head and member, said head sections in the closed position presenting spaced apart portions, a block on said element adapted to engage said portions of said head sections and hold said head sections in closed position in one position of said element, and means on said element for returning said member to a position in which it becomes locked to said head upon actuating said element, said last-named means extending in vertically spaced relation to said member when said third-named means are in operative position, for the purpose set forth.

9. A grapple fork comprising tines, a head, means connecting said tines to said head, a member and means connecting said tines inwardly of their points of connection with first-named means, to said member, releasable locking means for holding said member to said head operative to resist release of said member in the unloaded condition of the fork and, unless restrained, to permit release of said member in the loaded condition of the fork, an actuating element movable lengthwise relative to said head and member, means on said element for holding said locking means in locking position in one position of said element, and means on said element for returning said member to a position in which it becomes locked to said head upon actuating said element, said last-named means extending in vertically spaced relation to said member when said fourth-named means are in operative position, for the purpose set forth.

10. A grapple fork comprising tines, a head formed of pivotally connected sections adapting them to move into and out of closed position, means connecting said tines to said head sections, respectively, a member and means connecting said tines inwardly of their points of connection with said first-named means, to said member, said head sections and said member having mutually interlocking portions operative in the closed position of said head sections to lock said member to said head operative to resist release of said member in the unloaded condition of the fork and, unless restrained, to permit release of said member in the loaded condition of the fork, an actuating element movable lengthwise relative to said head and member, means on said element for holding said head sections in closed position in one position of said element, and means on said element for return of said member to a position in which it becomes locked to said head upon actuating said element, said last-named means extending in vertically spaced relation to said member when said third-named means are in operative position, for the purpose set forth.

ROBERT G. FERRIS.